United States

Fleischman

[11] 3,942,877

[45] Mar. 9, 1976

[54] SHORT FOCAL LENGTH PETZVAL-TYPE OPTICAL SYSTEM

[75] Inventor: Andor A. Fleischman, Northbrook, Ill.

[73] Assignee: Bell & Howell Company, Chicago, Ill.

[22] Filed: Nov. 11, 1974

[21] Appl. No.: 522,797

[52] U.S. Cl. ............................................... 350/220
[51] Int. Cl.² ........................................... G02B 9/34
[58] Field of Search .................................. 350/220

[56] References Cited
UNITED STATES PATENTS

| | | | |
|---|---|---|---|
| 2,744,445 | 5/1956 | Werfeli | 350/220 |
| 3,450,463 | 6/1969 | Yasuda | 350/215 X |
| 3,623,791 | 11/1971 | Uetake | 350/220 |

*Primary Examiner*—John K. Corbin
*Attorney, Agent, or Firm*—John E. Peele, Jr.

[57] ABSTRACT

This invention relates to a short focal length, large aperture Petzval-type optical system primarily designed to efficiently transmit light rays to an image plane with an extraordinarily high degree of correction over a prescribed field.

1 Claim, 9 Drawing Figures

F/1.11

F/1.59

2.58°

1.82°

SHORT FOCAL LENGTH PETZVAL-TYPE OPTICAL SYSTEM

This invention relates to a short focal length, large aperture optical system primarily intended for use in optical instruments.

Optical systems have been designed to efficiently transmit light rays to an image plane with an extraordinarily high degree of correction over a prescribed field. The optical system is of short focal length and high aperture to efficiently transmit light rays of a predetermined wavelength from a source of small size and to image the rays without degradation on an image plane at a smaller size than that of the source, in this instance, a low powered helium neon laser the beam of which is focused. This all-glass optical system of the modified Petzval type is intended for use in a mass-produced instrument, such as video disc player. The optical system is to be simple in design and assembly, relatively light weight and relatively low in cost, yet essentially diffraction limited over the prescribed field. Further, the design is to have optimum performance characteristics and to provide an image of substantially better correction than might be anticipated notwithstanding anticipated tolerance variations during manufacture and assembly.

An object of the invention is to provide short focal length, high aperture Petzval type optical system for efficient transmission of light rays of a predetermined wavelength from a light source of limited diameter and to image the rays without degradation on an image plane at a smaller size than that of the source.

Figure 1:
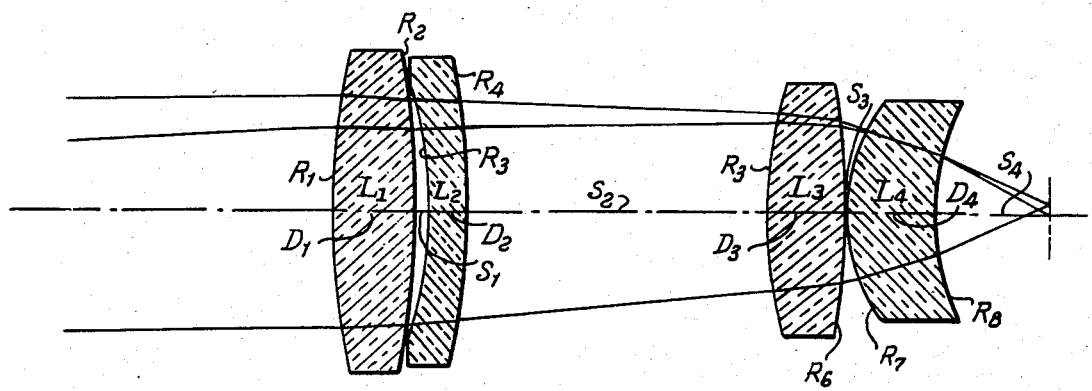

Other objects and advantages of the invention will become apparent from the detailed description which follows when taken in conjunction with the accompanying drawings in which:

FIG. 1 is a diagrammatic sectional view of a preferred optical system according to the present invention; and FIGS. 2a to 2h are graphical representations of the various aberrations of the lens system shown in FIG. 1 and having the design data given in Table 1.

Referring to the drawings; an optical system is shown for critically imaging light rays from a source having a limited diameter and essentially a single wavelength. In this preferred embodiment, the light source is a focused laser having an 0.8mm diameter beam and a wavelength of 6328 Angstroms. The arrangement of elements, configured as hereinafter described, provides for critically imaging the focused beam to a point source of extremely small diameter, while providing a lightweight, highly corrected all glass optical system of the Petzval-type which can be economically manufactured.

The optical system of FIG. 1 includes a first element $L_1$, starting at the ray entrance side of the system and positioned nearest the light source (not shown). The element is of positive power, and together with a negative element $L_2$, forms a convergent component group which receives the rays of the light source.

The second element $L_2$ is axially separated and slightly air spaced from the first element $L_1$.

The third element $L_3$ is relatively widely air spaced from element $L_2$. Element $L_3$ is of slightly positive power and function with positive element $L_4$ as a positive power component group for relaying the light rays to the image plane, to form a reduced image of the object.

The optical design may be modified to be used with a protective cover of optical material to reduce potential damage to a surface carrying optically coded information at the image plane.

The optical system is a 7.38mm (0.2904 inch) focal length objective having an effective aperture of f/1.04 (NA = .45). The system has a half angle of field of 2.58 degrees and is diffraction limited over this prescribed field. As seen in FIGS. 2a – 2h which diagrammatically represent aberrations of the FIG. 1 optical system, a combined high degree of correction is obtained while maintaining an extremely short focal length and a larger effective aperture.

The optical values of the optical system of FIG. 1 are as follows:

TABLE 1

EFL = 7.38mm
½ Angle of Field = 2.58°

| LENS | RADII (IN.) | THICKNESS (IN.) | SPACING (IN.) |
|---|---|---|---|
| $L_1$ | $R_1$ = .8013 | | |
| | | $D_1$ = .0890 | |
| | $R_2$ = 1.7049 | | |
| | | | $S_1$ = .0163 |
| $L_2$ | $R_3$ = – .4552 | | |
| | | $D_2$ = .0400 | |
| | $R_4$ = .8970 | | |
| | | | $S_2$ = .3381 |
| $L_3$ | $R_5$ = .5318 | | |
| | | $D_3$ = .0852 | |
| | $R_6$ = 1.4273 | | |
| | | | $S_3$ = .0050 |
| $L_4$ | $R_7$ = .1864 | | |
| | | $D_4$ = .0861 | |
| | $R_8$ = – .2589 | | |
| | | | $S_4$ = .1320 BFL |

ALL ELEMENTS: V=25.8, $N_D$=1.785

In the above table, the first column lists the lens elements numerically starting at the ray entrance side of the system which elements each have the same dispersive index and refractive index. The second column lists the radii for the respective surfaces of the elements, the + value of the radii indicate surfaces which are convex and the – value of the radii indicate surfaces which are concave. The third column lists the thickness of the respective elements. The fourth column lists the axial spacings between the respective elements and the nominal image plane. "EFL" is the effective focal length of the lens system. "½ Angle of Field" is one-half the angle between the continuation of the lens axis and a line from the nodal point of the lens to the most oblique point recorded on the film.

Figure 2A:
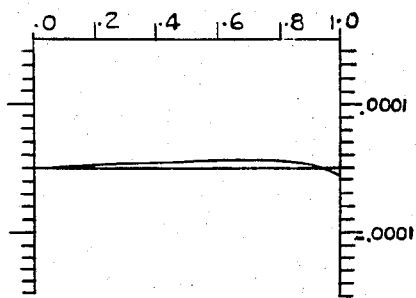
Figure 2B:
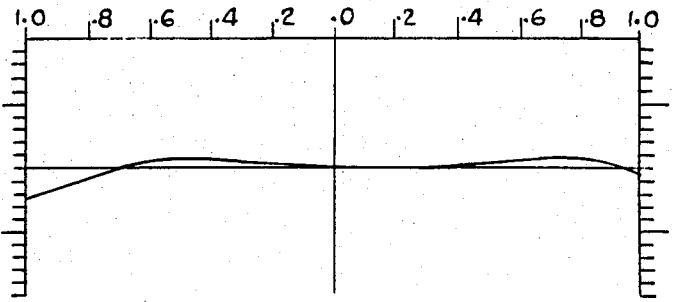
Figure 2D:
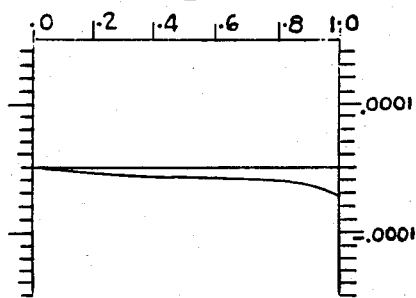
Figure 2C:
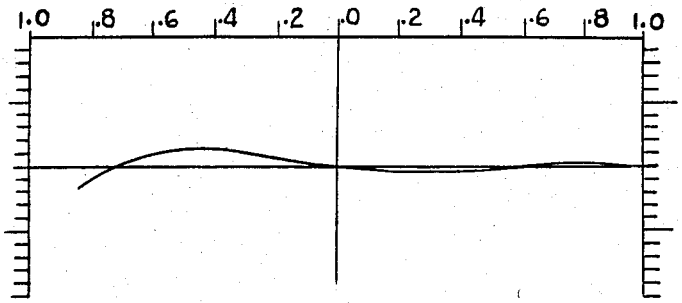
Figure 2E:
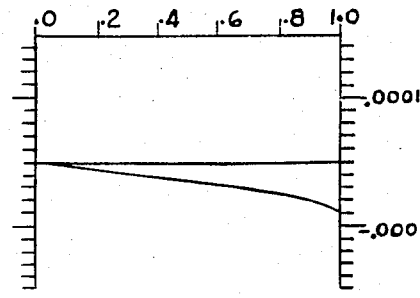
Figure 2F:
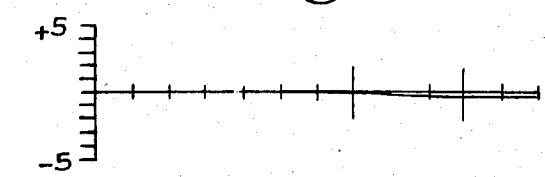
Figure 2G:
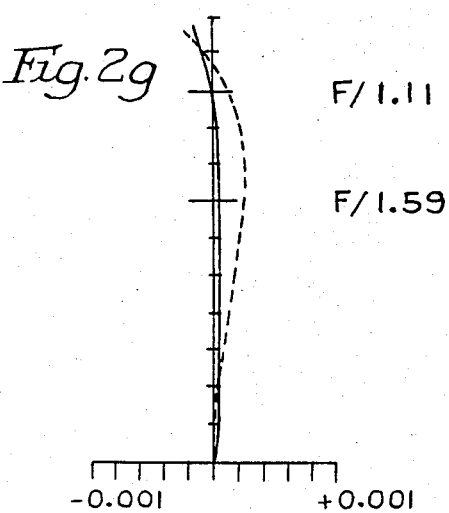
Figure 2H:
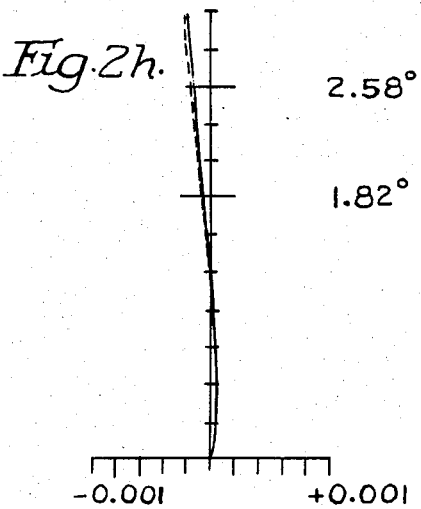

FIGS. 2a to 2h graphically represent various aberrations of this form of the optical system, as shown in FIG. 1 and having the design data recited in Table 1. FIG. 2a represents monochromatic correction of the rays on axis. FIG. 2b represents off axis aberrations of a ray passing from the zone of the film format and through the lens transversely and tangentially. FIG. 2c represents the aberrations of the rays passing from the corner of the film format through the lens tangentially and transversely. FIG. 2d represents the radial or longitudinal aberrations from the zone of the film format of rays entering the lens at 3 o'clock, while FIG. 2e represents similar aberrations from full field or corner rays. FIG. 2f represents distortion as a percentage of a "perfect" image. FIG. 2g represents the spherical aberrations by a full line and the offense-against-sine-condition by the dotted line. FIG. 2h represents the curvature of field with tangential curvature being shown in full line and sagittal curvature being shown in dashed

What is claimed is:

1. An optical system of relatively short focal length and large aperture having substantially the following specification:

EFL = 7.38mm
½ Angle of Field = 2.58°

| LENS | RADII (IN.) | THICKNESS (IN.) | SPACING (IN.) |
|---|---|---|---|
| $L_1$ | $R_1$ = .8013 | | |
| | | $D_1$ = .0890 | |
| | $R_2$ = 1.7049 | | |
| | | | $S_1$ = .0163 |
| $L_2$ | $R_3$ = −.4552 | | |
| | | $D_2$ = .0400 | |
| | $R_4$ = .8970 | | |
| | | | $S_2$ = .3381 |
| $L_3$ | $R_5$ = .5318 | | |
| | | $D_3$ = .0852 | |
| | $R_6$ = 1.4273 | | |
| | | | $S_3$ = .0050 |
| $L_4$ | $R_7$ = .1864 | | |
| | | $D_4$ = .0861 | |
| | $R_8$ = −.2589 | | |
| | | | $S_4$ = .1320 BFL |

ALL ELEMENTS: V = 25.8, $N_D$ = 1.785 wherein the first column lists the lens elements numerically starting at the ray entrance side of the system which elements each have the same dispersive index and refractive index; the second column lists the respective base radii $R_1$ to $R_8$; the third column lists the thickness $D_1$ to $D_4$ of the respective elements; and the fourth column lists the axial spacings $S_1$ to $S_4$ between the respective elements, and the image plane.

* * * * *